Sept. 21, 1965   I. W. LAKIN ET AL   3,207,002
CONVERTER DRIVE

Filed Jan. 28, 1965   7 Sheets-Sheet 1

INVENTORS.
Ira W. Lakin &
Richard P. Krause
BY
Green, McCallister & Miller

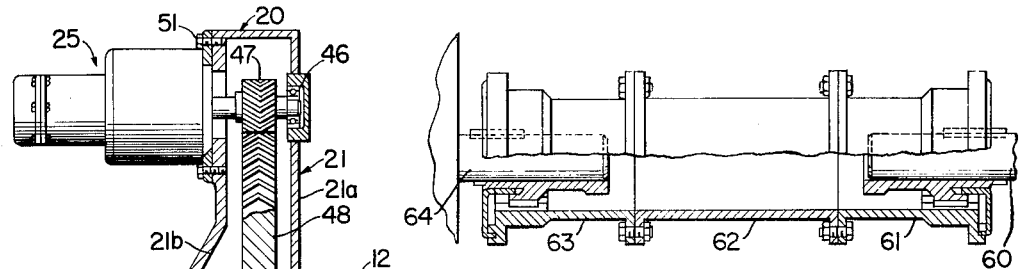
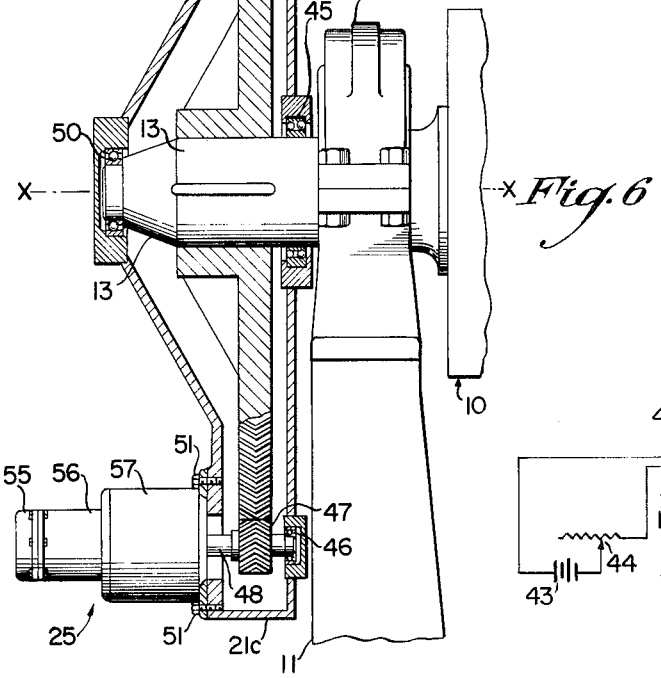
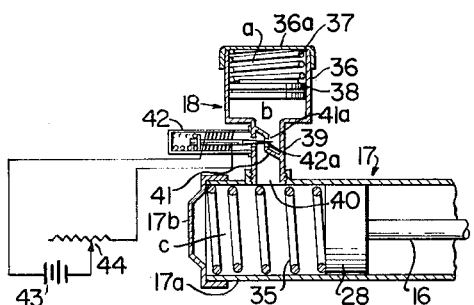
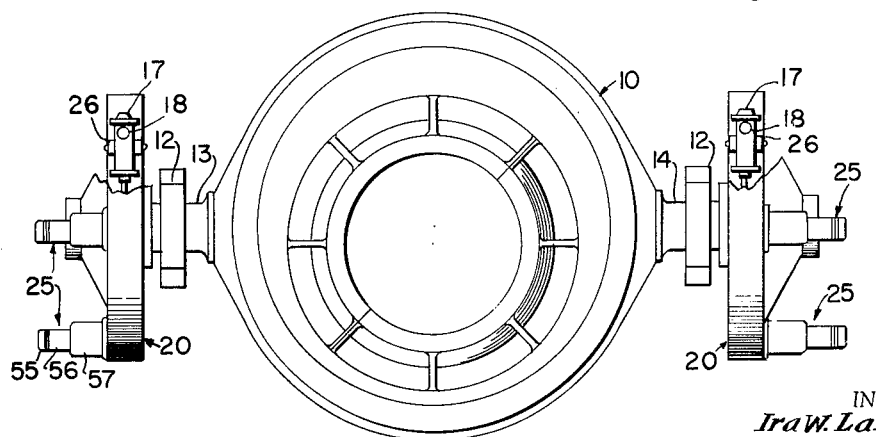
Fig. 11.
Fig. 6
Fig. 5.
Fig. 7.
INVENTORS.
Ira W. Lakin &
Richard P. Krause
BY
Green, McCallister & Miller Sept. 21, 1965  I. W. LAKIN ET AL  3,207,002
CONVERTER DRIVE
Filed Jan. 28, 1965  7 Sheets-Sheet 3

INVENTORS.
Ira W. Lakin &
Richard P. Krause
BY
Green, McCallister & Miller

Sept. 21, 1965
I. W. LAKIN ET AL
3,207,002

CONVERTER DRIVE

Filed Jan. 28, 1965
7 Sheets-Sheet 4

INVENTORS.
Ira W. Lakin &
Richard P. Krause
BY
Green, McCallister & Miller

THEIR ATTORNEYS

Sept. 21, 1965    I. W. LAKIN ET AL    3,207,002
CONVERTER DRIVE
Filed Jan. 28, 1965    7 Sheets-Sheet 5

INVENTORS.
Ira W. Lakin &
Richard P. Krause
BY
Green, McCallister & Miller
THEIR ATTORNEYS INVENTORS.
Ira W. Lakin &
Richard P. Krause
BY Green, McCallister & Miller
THEIR ATTORNEYS INVENTORS.
Ira W. Lakin &
Richard P. Krause BY Green, McCallister & Miller

THEIR ATTORNEYS

United States Patent Office

3,207,002
Patented Sept. 21, 1965

3,207,002
CONVERTER DRIVE
Ira W. Lakin, R.D. 3, Volant, Pa., and Richard P. Krause,
331 Pittsburgh Road, Butler, Pa.
Filed Jan. 28, 1965, Ser. No. 429,954
33 Claims. (Cl. 74—665)

This application is a continuation-in-part of our application Serial No. 166,541, filed Jan. 16, 1962, and entitled Converter Drive, now abandoned. Our co-pending application No. 235,964, filed Nov. 7, 1962, and entitled Converter Tilting Drive and Torque Assist discloses driving apparatus and means for resisting and containing turning movement in a heavy duty device that may be subjected to misalignment during its usage. Thus, the benefit of the filing date of application No. 235,964 is claimed as to any common subject matter.

This invention relates particularly to an improved driving mechanism or apparatus for a device in the nature of heavy equipment that may be subjected to misalignment during its use. Such a driving apparatus may be provided for tilting or rotating a Bessemer or oxygen converter or other metal refining furnace vessel which is subjected to high temperatures and to relatively wide volumetric temperature changes, heavy and irregular loading forces, and is required to rotate about an axis to different positions in connection with phases of its operation. This invention is broadly directed to an improved driving means for any heavy equipment device where there is a tendency towards axial misalignment or endwise axial vacillatory movement between a driven means or apparatus and a fixed-position source of driving power.

An important phase of this invention relates to the minimization or the elimination of out of alignment movement or to maintaining a constant operating relation between driven and driving gear members to enable mounting the driving member with a fixed cooperating or operating positioning upon and with respect to the driven member. Another important phase of the invention relates to the provision of means, other than driving means, for taking up forces, including shock forces, tending to turn or rotate a heavy device such as a converter vessel during loading. A further important phase of the invention involves the replacement of a single driving mechanism with a plurality of smaller mechanisms and in their employment in such a manner as to increase the reliability of the system as a whole and to make possible a better and more precise driving and positioning action.

In the steel making art, furnace vessels such as converters, operate through wide ranges of temperature due to a relatively cool loading operation and a relatively hot, metal-conditioning or refining operation. The wide range of temperature imposes a high degree of thermal expansion of the furnace vessel and its trunnions and hence, necessitates movement of the parts immediately connected thereto. Since furnace vessels are required to tilt or rotate about an axis to different operating positions, means must be provided for rotatably mounting the vessels and for transmitting a source of driving power to actuate them in their mountings or stands. The thermal expansion associated with furnace vessels has made it difficult to produce a completely satisfactory means for transmitting motive power thereto.

Previous approaches, known in the art, make provision for relative axial or misalignment movement between a driving gear and a driven gear, or provide for an axially-expandable connection in a shaft connected between the furnace vessel and the driving transmission. Such a form of device is shown in McFeaters Patent No. 2,483,017, issued Sept. 27, 1949.

The complexity of prior converter drive systems has given rise to difficulties, both from practical as well as economy standpoints, in the employment of plural drives, motors or power sources. On the other hand, a large and cumbersome single power or motor unit for each furnace vessel requires a large amount of costly floor space. A failure of such a single large power unit, of necessity, will shut-down the utilization of the associated furnace vessel. Also, due to the immensity of such a power unit, replacement or repair is difficult, cumbersome and time-consuming.

Converter vessels are normally loaded by machinery that dump in literally tons of molten metal, scrap and other materials, and thus, they and their associated mechanisms are subject to high, irregular, shock or jarring forces. These loading forces tend to cause undesirable rotation of the furnace vessel about its axis and so provision must be made to resist and contain such rotation. In existing converter vessel installations, these forces are absorbed by the driving mechanism, itself, which employs a gear transmission. The driving gears thus form a direct structural linkage between the jarred or rotated converter and the rigid supporting structure. Gears so employed must be designed to withstand such shock forces and thus, their design as drive gears must be compromised. The resulting design produces relatively coarse gear teeth having inherent, relatively large clearances and a corresponding high degree of gear "slop" and backlash.

It has thus been an object of our invention to solve the problems heretofore encountered in connection with vessel driving mechanisms;

Another object of the invention has been to provide an improved, economical, and simplified vessel drive mechanism;

It is also an object of the invention to provide a vessel drive mechanism wherein, each of the functions required of the mechanism is performed by component structure especially designed to produce primarily only that function, to thus eliminate compromises in component design that are necessary when components must perform more than one function;

It is another object of this invention to provide a vessel drive that has a high degree of reliability to minimize the relative amount of "shut-down time" as to vessel utilization;

A further object of this invention has been to devise a vessel drive that is powerful and that is compact to conserve expensive factory area;

A still further object of this invention has been to provide a vessel drive that is convenient and simple to repair and that eliminates the need for heavy machinery to handle the parts during repair work;

These and other objects of our invention will appear to those skilled in the art from the illustrated embodiments and the claims.

In the drawings, FIGURE 1 is an end elevational view of a converter vessel employing a first mode of our invention;

FIGURE 3 is an enlarged end detail in elevation showing a connection between the vessel and shock absorber means disclosed in FIGURE 1;

FIGURE 4 is a detail side view of and on the scale of the structure of FIGURE 3; it is taken in the direction of arrows IV—IV of FIGURE 3;

FIGURE 5 is an enlarged, cross sectional, detail view of the shock absorbing means shown in FIGURE 1, and showing somewhat diagrammatically means for controlling its operation;

FIGURE 6 is an enlarged side elevational view, partially in section, of driving and transmission structure comprising the first mode of our invention;

FIGURE 7 is a top plan view on the scale of FIGURES 1 and 2 of a vessel apparatus employing a modification of the first mode of our invention;

FIGURE 11 is a greatly enlarged side elevation, partially in section, showing details of the construction of the shaft coupling of FIGURE 9;

Figure 14:
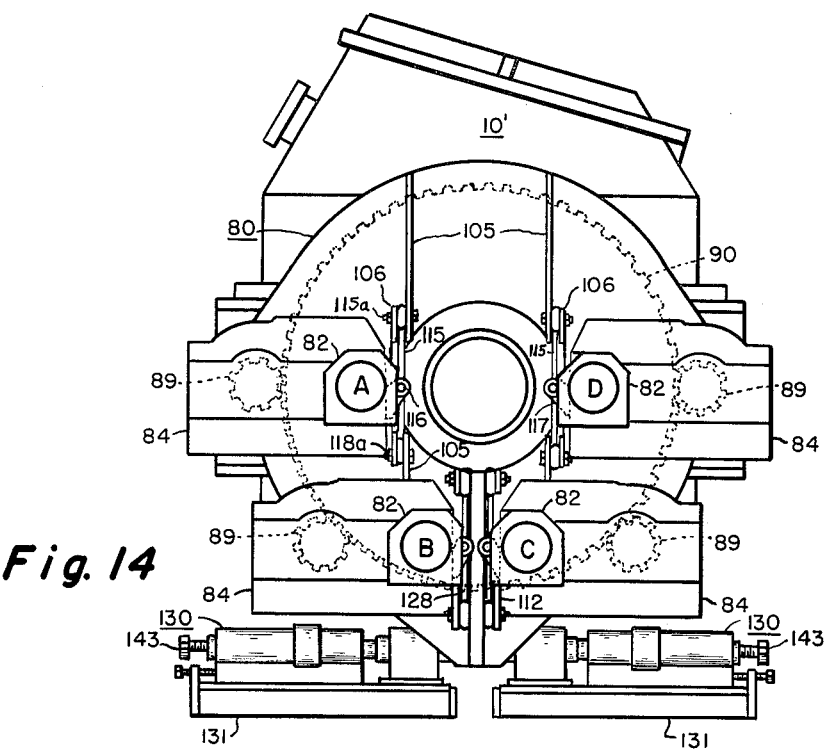
FIGURE 14 is an end elevation on the scale of and of the construction of FIGURES 12 and 13.
Figure 15:
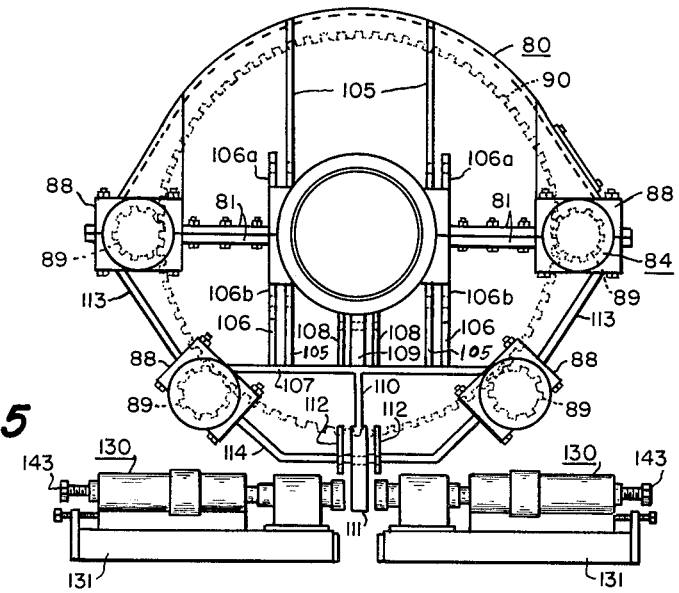
FIGURE 15 is a view similar to and on the same scale as FIGURE 14 but with speed reducing and motor units omitted.
Figure 19:
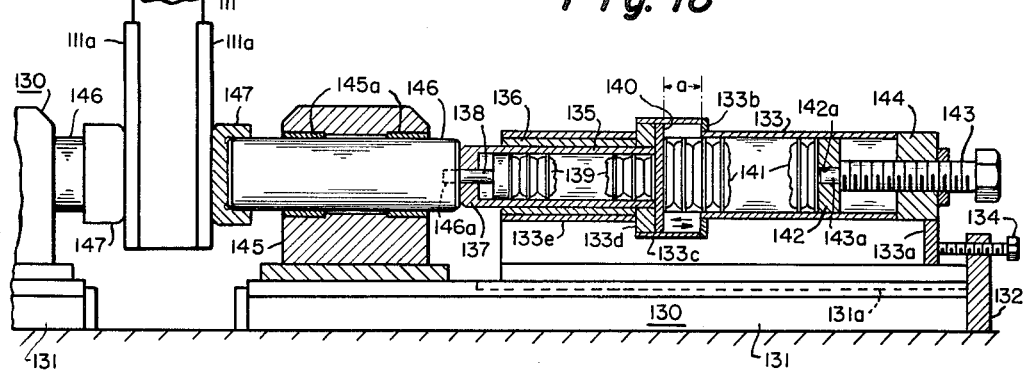
Figure 20:
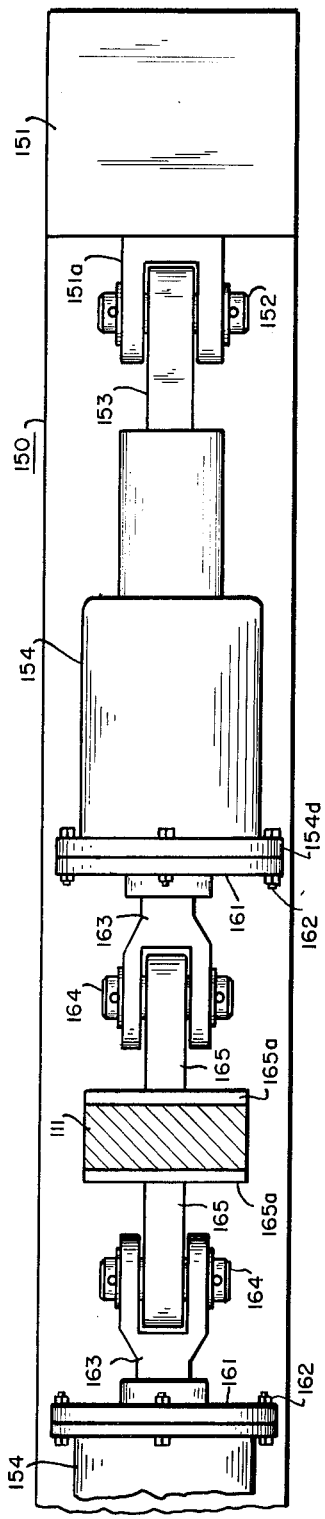
Figure 21:
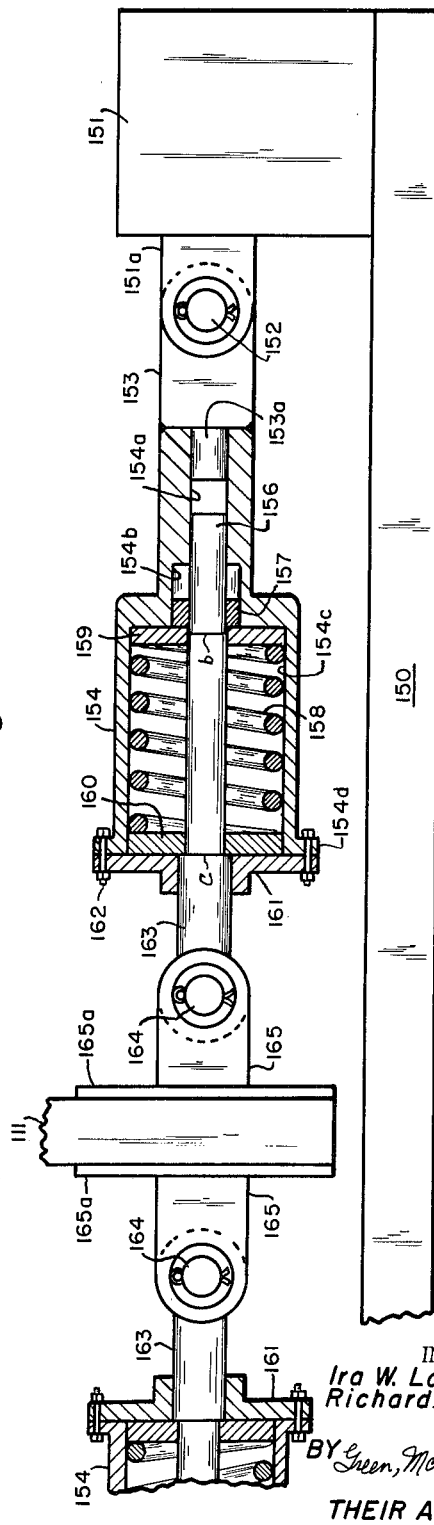

FIGURE 19 is an enlarged sectional front end view of the construction of FIGURES 14 and 15 illustrating a form of shock absorbing and turn resisting means which may be employed with the mode of our invention illustrated in FIGURES 14 and 15; this view particularly shows details of the construction of such means and is on an enlarged scale with respect to FIGURES 14 and 15;

FIGURE 20 is a top plan view illustrating another form of shock absorbing and turn resisting means on the scale of FIGURE 19; and FIGURE 21 is a sectional front end view on the scale of FIGURE 20 of the means of FIGURE 20.

The embodiments of the novel concept of our invention eliminate or at least minimize misaligning motion between transmission gears used for driving a vessel in its tilting or rotating movement. A more efficient and positive drive is thus provided. Such elimination allows the gears of the transmission to be designed for most efficient driving operation without compromising their design to requirements for allowing relative transverse motion. Specifically, a helical or herringbone form of gear teeth can be employed with a corresponding increase in gear efficiency and smoothness of operation inherent therein.

Furthermore, a much simpler structure arrangement of gear supporting structure and the gears, themselves, is made possible when the gears and supporting structure need not be concerned with relative misalignment or non-coincident axial motion therebetween. Since the structure and support of the gearing is relatively simple, it becomes economically feasible to provide several driving gears for a single vessel to reduce the power and force that must be transmitted by each individual gear tooth. The gear teeth employed thus can be made of a finer quality and somewhat lesser strength than if each tooth had to be designed to carry the total force required in tilting the vessel.

It is also desirable to employ power units in diametrically opposite pairs to eliminate bending forces that may otherwise be applied to the vessel trunnion shaft. Division of power supplied to several units will increase the reliability of the system as a whole, since failure of one of the driving units need not cause a shut-down of the whole system, as would be the case if only a single driving unit is employed.

Furthermore, the novel concept of our invention makes possible the provision of means, other than driving gears, for absorbing rotational shock loads of a type to which a converter vessel may be subjected during the loading of scrap and other charging material, and to force components that may be set up by its rotational or turning movements. The driving gears of our embodiments are supported from the driven shaft and thus, do not form a direct, rigid, structural linkage between the rotating converter vessel and a rigid or stationary supporting means.

Figure 1:
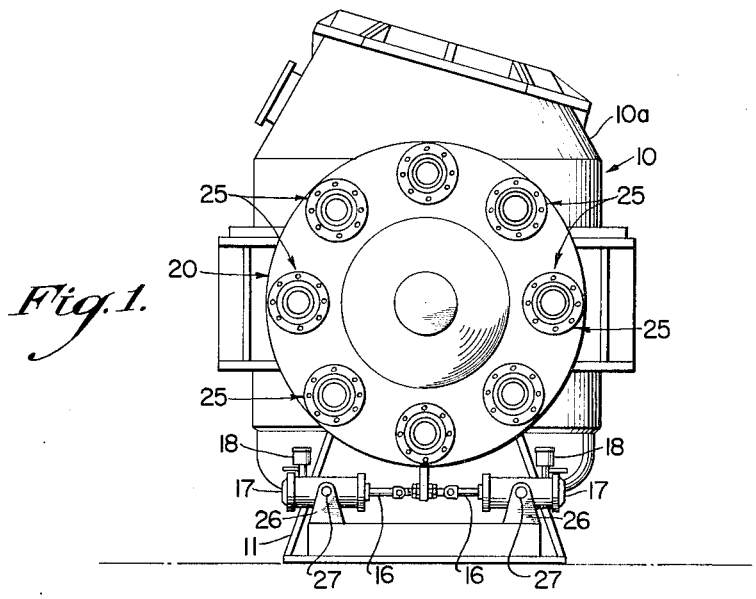
Figure 2:
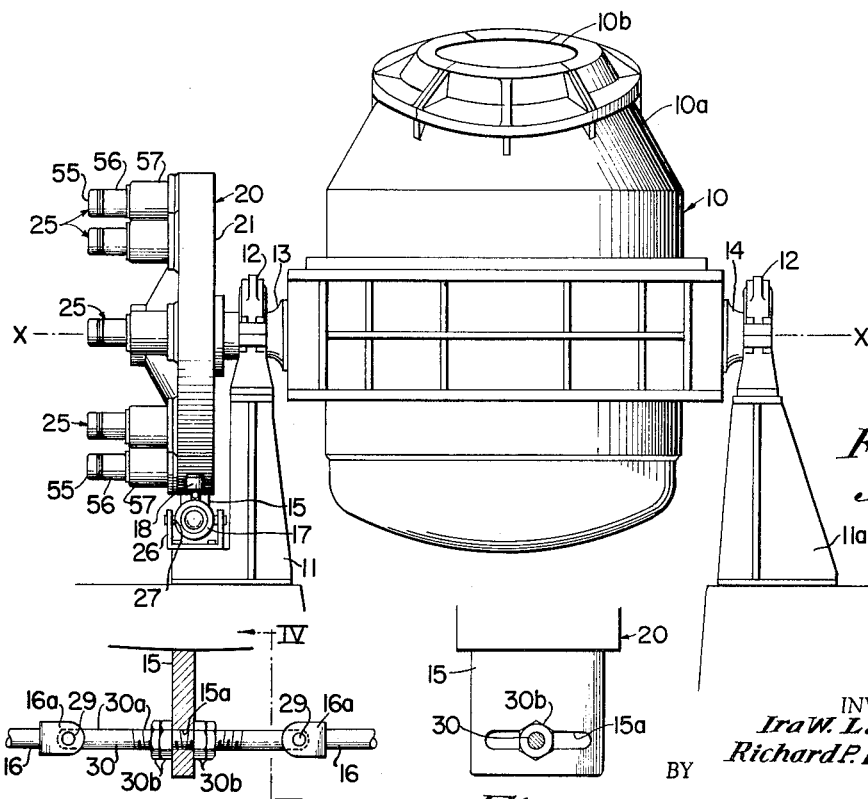
FIGURE 2 is a side elevational view of the vessel shown in FIGURE 1.

Referring now to the drawings where several exemplary embodiments of our novel concept are illustrated, FIGURES 1 and 2 show a converter or other material refining furnace vessel 10 having a converging, metal-charge-receiving and molten metal and slag-pouring side wall 10a that terminates in an outwardly-directed, open mouth portion 10b. The vessel 10 is mounted on stationary structure such as supporting bases or opposed stands 11 and 11a by bearings 12 and diametrically-opposed, outwardly-extending, co-axial trunnion shaft members 13 and 14 for tilting movement about an axis X—X, e.g., from a vertical position to a tilted or horizontal position, and vice versa.

A driving transmission or gear mechanism or unit, generally indicated as 20, is shown mounted on an extending portion of the shaft 13, radially-outwardly of the bearing 12, and endwise beyond the converter vessel 10 to support suitable motor or motive power means 25. The mechanism 20 is shown as having an outer, radially-extending casing, housing, gear cage or secondary support structure 21 which is rotatably mounted with respect to or journaled on the shaft 13. However, turning or rotative movement of the support structure 21 is resisted and contained or prevented with respect to the stands 11 and 11a, by a projecting, rotation-resisting, plate-like flange, web, bracket, member or stabilizing means 15 that is shown extending radially with respect to and centrally or in the vertical plane of the axis of the unit 20 and cooperates with inner end portions of a pair of opposed movement-resisting parts or connecting rod members 16.

The rod members 16 extend transversely of the end of the vessel 10 and are connected at their forward ends to turning or rotative-movement-resisting, torque-snubbering, force-dampening or shock absorbing units 17. These torque snubbers or shock absorbers 17 may be of any suitable design (fluid and/or spring type), but preferably have a selective or adjustable degree of shock or force resistance, as determined by control means 18 (see FIGURE 5). Each shock absorber unit 17 is shown pivotally supported on the fixed base or supporting stand 11 by an upstanding, U-shaped bracket member 26 and side pins 27.

Details of the flange, web or stabilizing member 15 are shown in FIGURES 3 and 4. It will be seen that each connecting rod member 16 has a piston head 28 (see FIGURE 5) at its one end that slidably operates within a casing or cylindrical housing wall 17a of each unit 17. The other or forward end of each rod 16 has a bifurcated mounting 16a to, by means of a through pin 29, pivotally secure it to one end of a centrally-disposed connecting member or rod 30. A preferable mounting is a universal type, such as illustrated by the connection between the two shaft portions in FIGURE 3 of our application No. 235,964. The common or central connecting rod 30 is shown provided with means, such as centrally-disposed screw threads 30a, to receive pairs of adjustable and position-lock nuts or abutment elements 30b. The elements 30b, not only enable a proper, adjustable alignment of the flange or plate member 15 with respect to the rod 30, but rigidly secure it thereto. The rod 30 is thus operatively secured to the rods 16 and the turning-movement-resisting units 17.

As shown in FIGURE 3, the central connecting rod 30 extends through an opening hole or transverse slot 15a in the member 15 and is secured in position by the opposed nut elements 30b that abut against opposite sides of the member 15. The positioned or connected arm relationship shown in FIGURES 1 and 3 enables the stabilizing member 15 to accommodate for and to control coincident axial movement of the driven gear 48, the driving gear 47 and the cage support 21 with the shaft 13.

The transverse slot 15a in the radially-projecting arm, flange or stabilizing member 15 (see also FIGURE 4) provides for controlling lateral or sliding movement with respect to the connecting rod or the turning movement resisting and containing means 30, when endwise or misaligning expansion or contraction force is exerted by the device or furnace vessel 10 during its operation. The frictional-resisted movement thus provided permits limited, controllable relative lateral movement of the transmission unit 20 and its support structure 21 that are carried on the shaft 13, with respect to the fixed or stationary stand or base support means or structure 11. In this manner, we control coincidental axial movement of the support structure 21 as well as of the gear means and other operating means carried thereon that is caused by endwise movement or axial misalignment of the shaft 13, and do so in cooperation with the rotation-resisting unit 17 (see also FIGURE 5) that are mounted on the base support structure. It is thus apparent that we provide for endwise-angular or axial misalignment or growth of the trunnion shaft 13 while, at the same time, take-up or absorb rotational shock as well as resist turning movement of the support structure, the gears and other parts carried thereby. There is thus an overall maintenance of an effective operating relation, irrespective of forces exerted on the device such as the furnace vessel 10, that may be due to thermal expansion of the device and its trunnions or may be due to external forces including shock which are exerted on the device.

Details as to the construction of each movement-resisting unit or means 17 and the control means 18 therefor are disclosed in FIGURE 5. The cylinder wall 17a of each unit 17 is shown as open at one end to receive the piston head 28 and as closed at its opposite end by a cap 17c threadably-secured or flanged thereon. A strong expansion spring or resilient compression-resisting means 35 is contained within a downstream (variable volume) fluid chamber c that is defined by the inner portion of the cylinder wall 17a to normally urge piston head 28 outwardly towards the flange or stabilizing member 15 (see FIGURE 1).

The control means 18 for varying the amount of resiliency or shock absorption of each unit 17 is shown provided with a variable resistance exhaust or fluid-flow passageway from an upstream (variable volume) fluid chamber b to the accumulator or downstream fluid chamber c. The chamber b is variably formed by a floating piston head or movable wall member 38 and a downstream portion of a cylindrical housing wall 36 within which it is slidably positioned to define a variable volume chamber. The upper end of the wall 36 is closed-off by a threaded-on cap 36a. The movable piston or wall member 38 is urged by an expansion spring or resilient force-applying means 37 towards the chamber b to resist flow of fluid therein and to accordingly assist flow of fluid from chamber b into the downstream chamber c.

A conduit means or connecting neck 39 communicates between the chambers b and c through an opening or port 40 in the cylinder wall 17a of the unit 17 to provide fluid flow between variable volume chambers b and c. A variable flow restriction or orifice 41a is provided in a partition wall 41 within the neck 39 for varying the degree of shock absorption or force dampening by varying the resistance to flow. This variable flow restriction is controlled by any suitable means, such as a needle valve 42a and a proportional solenoid 42. The solenoid 42 may be controlled by a variable electric current supply provided, as schematically shown, by a battery, power source or supply 43 and a variable resistance or potentiometer 44.

Each variable-resistance shock absorber unit 17 operates in such a manner that, if a high degree of shock absorption or a high degree of position maintenance of the transmisison support structure 21 is required, the needle valve 42a of the variable restrictor is moved to the right of FIGURE 5 to reduce the flow area through the orifice 41a. For the transmission casing or support structure 21 to turn or partially rotate, fluid must flow from the chamber c through flow-restricting passage into the chamber b. Such rotation will thus be met by a relatively high fluid pressure from chamber c. On the other hand, if a relative large amount of resiliency is desired, such as during a loading operation of the furnace vessel 10, the needle valve 42a of the variable restrictor is moved to the left of FIGURE 5 to provide relatively free flow of the fluid between the chamber c and the chamber b. Thus, upon a tendency for the support structure 21 to turn or rotate to move the piston head 28 towards the head of the chamber c, fluid from chamber c will flow easily into chamber b and the shock will thus be absorbed.

Although a specific embodiment of the variable resiliency shock absorber units 17 has been shown, any suitable type may be employed. The units 17 may use a compressible fluid, such as air or a non-compressible fluid such as oil, but we prefer the latter.

In FIGURE 6 of the drawings, details are illustrated of the driving transmission unit or mechanism 20 which forms an important part of our invention. The transmission includes the casing, housing or cage-like support structure 21. A plate-like, radially-extending, shown as circular, enclosing, housing back or end wall member 21a is supported on the trunnion shaft 13 by anti-friction or other suitable bearings 45 to allow relative rotational movement of the trunnion shaft 13. The back wall member 21a, adjacent its outer periphery, has bearings 46 which may be of an anti-friction or other suitable type to rotatably support drive pinions 47 and pin shafts 48 on which they are feathered or keyed in a substantially endwise fixed position with respect to the wall member 21a and the trunnion shaft 13.

The cage or support structure 21 also includes a radially-extending, shown as substantially peripherally-circular, enclosing, front end wall or plate or housing wall member 21b that is supported by the trunnion shaft 13 through an anti-friction or other suitable bearing assembly 50. The nature of this support is similar to the support afforded by bearing assembly 45. The spaced assemblies 45 and 50 secure the support structure 21 against endwise or axial movement on the trunnion shaft 13, while providing for rotation of the shaft with respect to the support structure. The end wall member 21b supports power or driving means, generally indicated as 25, that may be secured thereon by suitable means such as the bolts 51.

Each unit of the driving means 25, as shown, includes a brake 55, an electric motor 56, and a speed reducing gear transmission 57, all of which are operatively connected through suitable shafting to drive one pinion gear 47 and to provide it with additional support.

End wall member 21a is rigidly connected in a forwardly-spaced relation to end wall member 21b by a peripherally-extending, shown as substantially cylindrical, enclosing top plate or circumferential housing portion 21c. In a preferred form of the casing, cage or housing structure, the plate members 21a and 21b form a closed housing chamber about the moving gear parts of the transmission to shield such parts from dirt and other foreign materials. Also, the closed housing simplifies lubrication of the moving parts.

A bull driven gear 48 is securely mounted (as by a key) on the trunnion shaft 13 within the casing 21 and extends radially-outwardly to carry gear teeth. The gear teeth may take any suitable form; however, our novel supporting arrangement makes it possible for the teeth to be of a helical type and of the herringbone form illustrated in FIGURES 6, 8 and 9 of the drawings. The driven gear 48 is positioned to cooperate with the drive pinion gear 47 to be driven thereby when it is desired to tilt the converter vessel 10 about axis X—X by rotating it about its trunnions. The teeth of the drive gear 47 may also be of a herringbone type to cooperatively mesh with the teeth of the driven gear 48.

It will be noted that a plurality of driving units 25 are preferably employed in a peripherally-spaced relation about the front member 21b, thus dividing the turning motive force required to tilt the converter vessel 10 into several relatively smaller driving units. The use of several relatively smaller units increases the reliability of the system as a whole, and decreases the force or stress that must be absorbed by individual meshing teeth between the driving pinion gear 47 and the the driven bull gear 48. Such reduction in force enables the gear teeth to be more economically designed and produced, with finer detail, and a lesser pitch, so that backlash and other "slop" between the meshing members can be substantially reduced.

In the operation of the device thus described, upon thermal expansion of the converter 10, causing axial misaligning or endwise-axial vacillatory movement of the trunnion shaft 13, the housing or support structure 21 will be bodily carried by central bearings 45 and 50 with the trunnion shaft 13 to thus simultaneously carry the pinion gears 47 and their drive units 25 in a coincident axial manner along with the trunnion shaft. There is thus no relative misaligning movement between the pinion gears 47 and the bull drive gear 48.

Upon a loading or other shock force being applied to the converter vessel 10, tending to produce a turning about the axis X—X, the bull gear 48 will transmit this shock force through the pinion gears 47, and through the supporting cage or housing 21 to the torque snubbers or shock absorbing units 17 which absorb the force. It will thus appear to those skilled in the art that force due to shock loading which the driving gear and pinions must withstand, is greatly reduced due to the novel construction disclosed. By reducing the shock loading requirement of the gears, a still further lowering of "slop" and backlash is accomplished, and a better device may be produced at a substantially lower cost.

In large capacity or heavier converter installations (75 to 250 ton vessels and larger), very large turning forces are required. Individual driving mechanisms or motors for producing these large turning forces become cumbersome and occupy more space than is economically desirable. Our novel supporting and driving mechanism and structure, through its simplicity and compactness, makes it possible for several smaller primary driving units to be economically employed.

In FIGURE 7 there is disclosed a modification of the novel driving mechanism shown in FIGURES 1 through 6 for use with larger installations. A pair of similar, opposed units 20 are provided, one on the trunnion shaft 13, the other on trunnion shaft 14. We thus can provide a group of opposed, blancing, driving, and shock-absorbing mechanisms or apparatus that require a relatively small amount of space, and accomplish the job of driving the vessel in a highly reliable manner.

FIGURES 8 through 11 show a second form or mode of our invention and illustrate the breadth of the concept involved.

Figure 8:
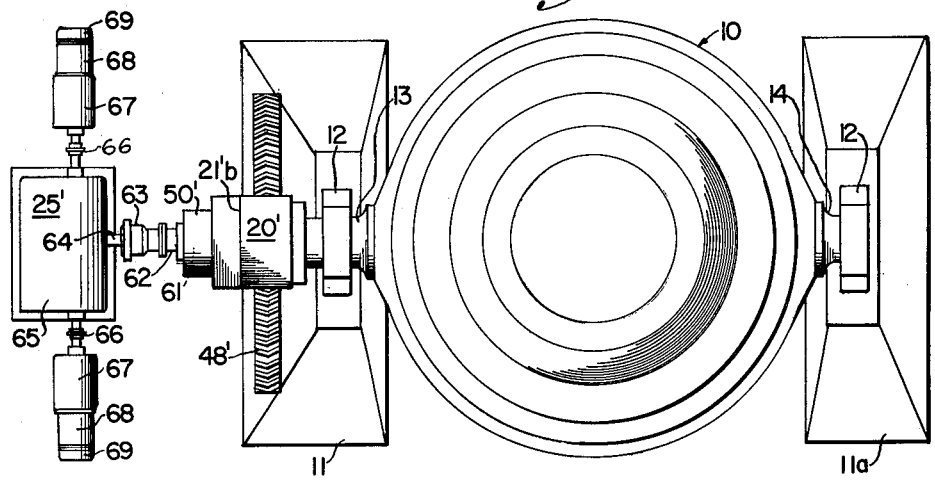
FIGURE 8 is a plan view on the scale of FIGURE 7 of a vessel apparatus employing a second mode of our invention.
Figure 9:
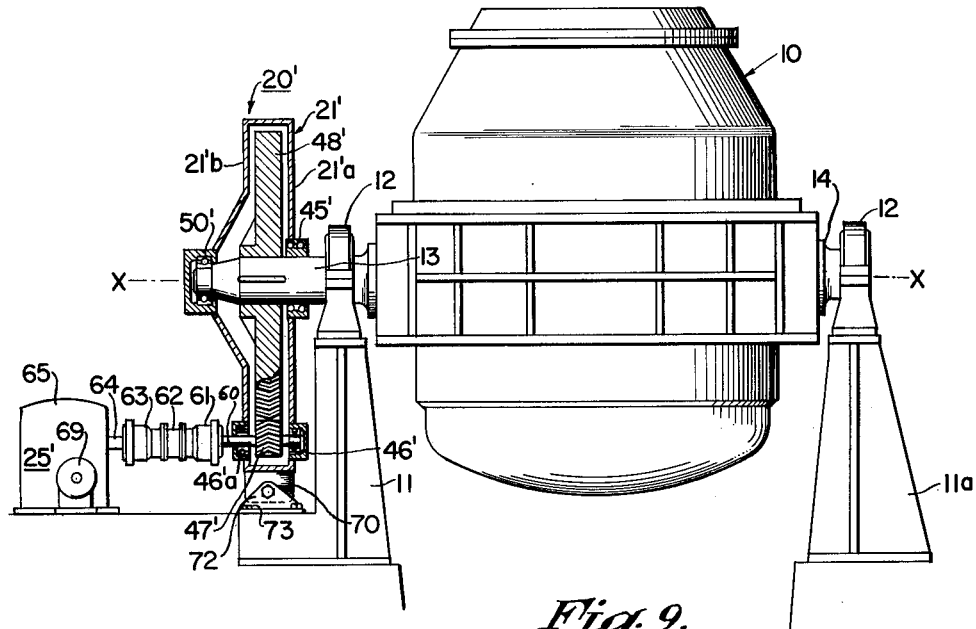
FIGURE 9 is a side elevational view on the scale of and of the apparatus shown in FIGURE 8.
Figure 10:
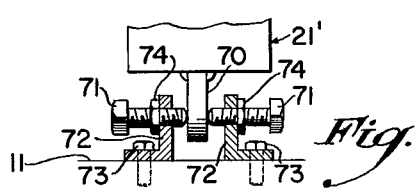
FIGURE 10 is an enlarged end elevation of a detail showing rotation-resisting means used in the second mode of our invention.

In FIGURES 8 and 9, driving unit 20' has a strap-like bearing cage, housing or support frame or structure 21' mounted on and rotatably-receiving trunnion shaft 13. A driven bull gear 48' is keyed on the shaft 13 within the support frame 21' and meshes with a drive pinion gear 47' for driving it and turning or rotating the vessel 10. Centrally-disposed, axially-spaced-apart bearings 45' and 50' of the frame 21' rotatably support it on the trunnion shaft 13. The cage or support structure 21' may be similar to the support structure 21 of the construction shown in FIGURES 1 through 6; however, it is shown of open construction and as having a radially-extending, centrally-disposed, strap-like front member or portion 21'b and a centrally-disposed, back strap-like member or portion 21'a. The bearing assemblies 45' and 50' and the mounted arrangement of the unit 20 prevent axial movement or maintain a substantially constant or coincident operating relation movement of the cage 21' with respect to the trunnion shaft 13. The front and back portions 21'b and 21'a of the cage 21' are secured together in a spaced relation by top and bottom integral connecting portions to provide a unitary structure.

Bearing assemblies 46' and 46'a of the cage or support structure 21' carry a drive shaft 60 on which the pinion gear 47' is keyed or otherwise secured. The shaft 60 is connected through a coupling part 61, intermediate or coupling shaft 62, coupling part 63 and shaft 64 to a generally designated power or motor unit 25'. The unit 25' comprises a centrally-disposed, speed-reducing, gear box 65 that is shown driven by laterally-positioned, opposed motors 68 through gear boxes 67 and couplings 66. A brake 69 is provided for each motor 68.

A radially-outwardly or downwardly-extending flange, arm, rib, bracket member or stabilizing member or means 70 is provided at the lower portion of the support structure or cage 21' for resisting or holding it against rotational or turning movement during the tilting operation of the converter vessel 10. The flange 70 is held between a pair of opposed, rod-like clamping or abutting elements or bolts 71 that are adjustable (see FIGURE 10). Each element 71 may be a threaded bolt adjustably mounted to extend transversely towards the other element of the pair in an opposed relation to, at its end, engage one side of the flange, web or bracket 70. A pair of angle-shaped mounts 72 carry the elements 71 and are secured in a spaced and opposed relation on the stand 11 by suitable means, such as bolts 73. Nuts 74 are shown used on the stems of the adjustable elements 71 to retain them in desired adjusted positions.

It will be seen that forces set up due to loading of the converter 10 are absorbed by the elements 71 which form somewhat rigid turning-force-resisting means, as distinguished from the gears which, as will be described later, are relatively free to move in an angular sense with respect to the rigid base structure 11. Although the means 71, 72 does provide some flexibility, as by the upstanding portions of the mounts 72, it is less flexible or resilient than the means employed in the embodiment of FIGURES 1 to 6. The abutting relation of the elements 71 with respect to the flange 70 permits controlling movement therebetween when the vessel 10 expands and moves or tilts its trunnion 13 out of axial alignment. It will be noted that the constructions of both FIGURES 3 and 10 permit the gear housing to tilt or axially coincide with misalignment of the shaft portion on which it is mounted. See the pivot points provided by the pins 29 of FIGURE 2 and the pivot provided by the abutment of the elements 71 with the means 70 of FIGURE 10.

Driving power in this embodiment of the invention is supplied through a flexible or self-aligning shaft or coupling assembly 61, 62 and 63 to allow axial, tilting or endwise and lateral flexure. Details of the flexible shafting are shown in FIGURE 11 and are generally similar to the flexible or self-aligning shaft assembly disclosed in the McFeaters Patent No. 2,483,017, referred to above. The flexible shafting includes relatively loose-fitting splines between the drive shafts 60 and 64 and the floating shaft 62. This relatively loose spline connection will transmit torque between, while allowing relative lateral, axial or endwise displacement. The connection may be a slipper type such as used for rolling mills. An ordinary rigid coupling 66 or a flexible, relatively loose spline coupling connection (see FIGURE 8), of similar construction to the relatively loose coupling or flexible spline connections 61 to 63, may be used between each motor 68 and the gear box 65.

It will thus be seen that upon thermal expansion of the converter vessel 10, tending to cause endwise or axial misalignment or movement of the shaft 13, the driven bull gear 48', the cage 21' and hence, the pinion gear 47', will all be carried in coincidence with the movement of the shaft 13 and thus, no relative axial, tilting or misaligning movement occurs between the bull gear 48' and the drive pinion gear 47'. The advantages of such a lack of axial movement explained in conjunction with the embodiment shown in FIGURES 1 through 6 are inherent in this embodiment.

Axial movement of the cage 21' and the pinion 47' is absorbed in the axially flexible shafting or coupling 61 to 63. It will be noted that the pinion gear 47' is not externally restrained by the driving mechanism from relative rotational movement about the tilting axis X—X and hence, the gear 47' can move about such axis the necessary small amount to transmit shock upon loading of the converter 10, through the bearings to the flange 70 and the retaining means 71, 72. Although this particular type of driving apparatus is better suited to the use of a single driving gear 47', the expansion-force compensating means 71 and 72 permits the use of a group of such gears (see the embodiment of FIGURE 2) by, for example, placing a second motor power means 60 to 69 on a platform above the means shown in FIGURE 9 and mounting a second gear 47' to mesh with the gear 48' at a position above the first motor power means disclosed in such figure.

Although only a single form of the second embodiment of our invention has been shown, it will be obvious to those skilled in the art that other modifications may be employed without departing from the scope of our inventive concept. For example, as indicated above, a group of driving means can be provided by angular spacing of shaft inputs. Also, a second opposed driving unit may be employed in the manner of the unit 20' of FIGURE 7 for employment with and for driving the opposite trunnion shaft 14. Details of the driving mechanism and the flexible shafting are shown for illustration purposes. It will appear to those skilled in the art that a strap-like cage member, as is shown in conjunction with the second embodiment of our invention, can be substituted for the housing or support member 21 of the first embodiment of our invention.

In the mode or embodiment of our invention shown particularly in FIGURES 12 to 19 of the drawings, a device 10' such as a furnace vessel or converter has shaft portions 13' and 14' journaled in bearings 12' that are mounted on stationary support bases or opposed stands 11' and 11'a. A secondary support gear housing, cage or casing 80 is mounted on the shaft 13' for coincident movement therewith and in such a manner as to provide for relative rotative movement with respect to the shaft 13'.

Figure 12:
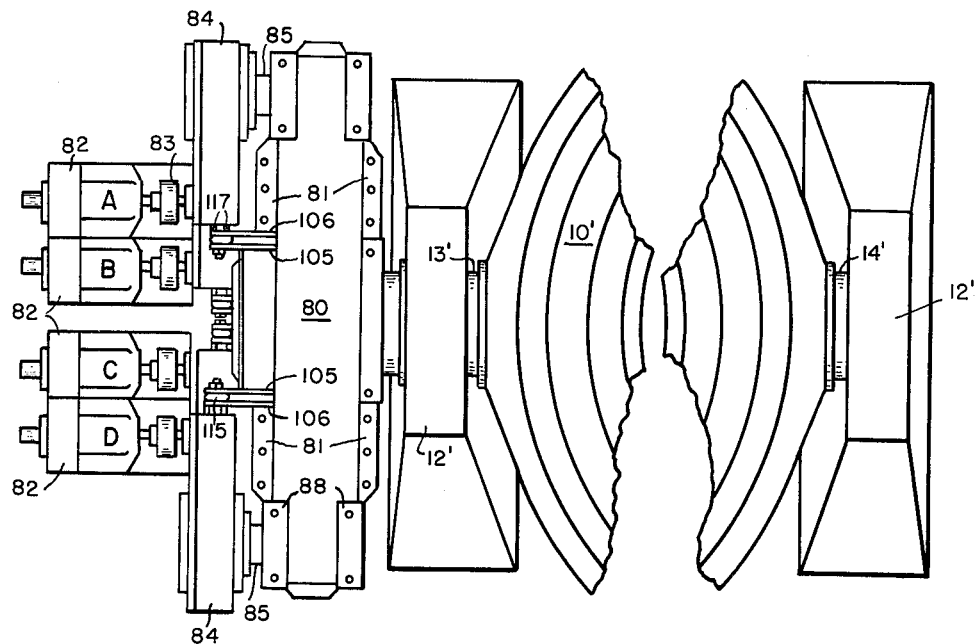
FIGURE 12 is a top plan view on a slightly enlarged scale with respect to FIGURES 1 and 2 showing a device employing an improved construction of our invention.
Figures 16, 17:
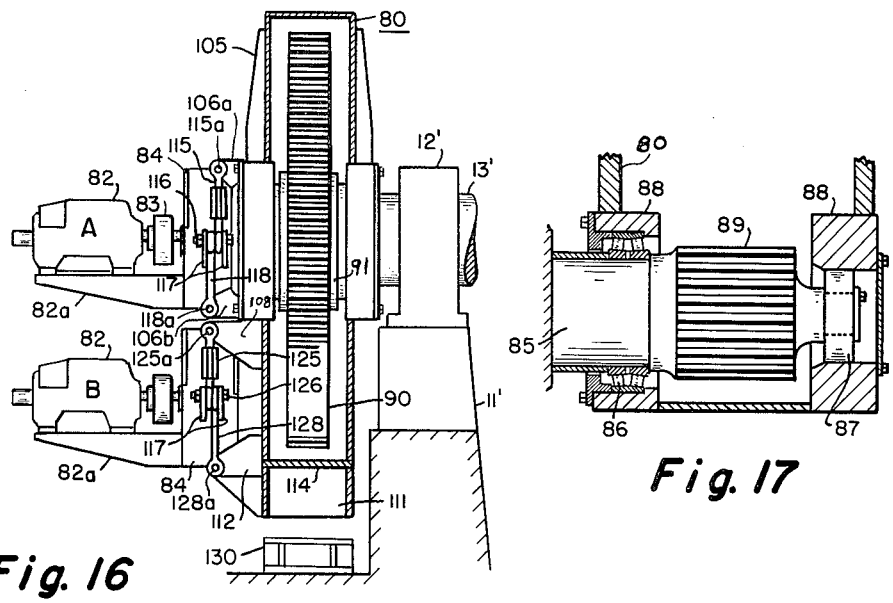
FIGURE 16 is a fragmental cross sectional side view in elevation on the scale of FIGURE 15, illustrating details of the construction or mode of our invention shown in FIGURES 12 to 15.
FIGURE 17 is an enlarged side section in elevation illustrating the mounting of driving pinions employed in the construction of FIGURES 12 to 16.
Figure 18:
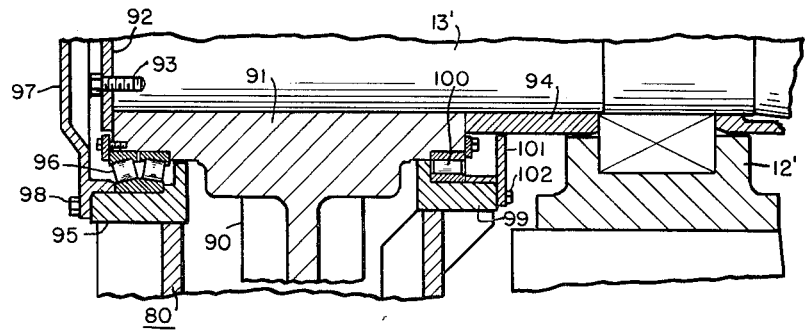
FIGURE 18 is an enlarged fragmental side section in elevation showing details of the mounting for a driven gear of the construction of FIGURE 16.

As illustrated particularly in FIGURES 12 and 15, the casing or housing 80 may be made up of upper and lower halves that are securely bolted together at reinforcing, cross-extending flanges 81 to form a radially-outwardly extending enclosure for a driven gear wheel 90. The gear 90, as shown particularly in FIGURES 16 and 18, is supported on, carried by and secured for rotation with the shaft 13' by means of a gear hub or collar 91 that is directly secured for rotation with the shaft 13'. It will be noted that the hub 91 has a tongue and groove fitting with the gear wheel 90 in such a manner as to key the gear wheel to the shaft 13'. As a result, the hub 91 as well as the driven gear 90 are mounted on or carried by the shaft 13' for coincident axial as well as rotational or turnable movement with the shaft. An end closure plate 92 is positioned over the front end of the hub 91 and is shown secured to the shaft 13' by jack screws 93. As shown, the jack screws 93 project through the front closure plate 92 and threadably-engage within the forward end of the shaft 13'. An inwardly-positioned bearing spacer sleeve 94 extends between main bearing 12' and the mounting hub or collar 91. A front closure plate or member 97 for the housing 80 is positioned, as shown in FIGURES 16 and 18, in a spaced relation in front of the end closure plate 92 and as secured to an angle-shaped bearing mount 95 by jack screws or threaded bolts 98.

It will be noted that front bearing mount 95 and a somewhat similarly shaped back bearing mount 99 are secured to and integral with the housing 80 at its inner peripheral opening about the shaft 13. The mounts 95 and 99 are adapted to carry conventional bearing assemblies, such as Torrington bearing assembly 96 and roller bearing assembly 100 that engage journaling inserts carried by adjacent opposite ends of the hub 91. The housing 80 thus has front and back bearing assemblies that journal it with respect to and on the hub 91 and thus, with respect to and on the shaft 13' and for coincident axial or angular movement therewith. The closure member or plate 97 closes-off the front end of the housing or casing 80 adjacent the front end of the shaft 13'. Box-like back bearing assembly 100, as shown in FIGURE 18, is closed-off by a back end closure plate 101. As shown, the plate 101 is removably-secured in position to close-off the spacing between the spacer sleeve 94 and the back end of the bearing assembly 100 by jack screws or threaded bolts 102 that threadably-extend into the back bearing mount 99.

Figure 13:
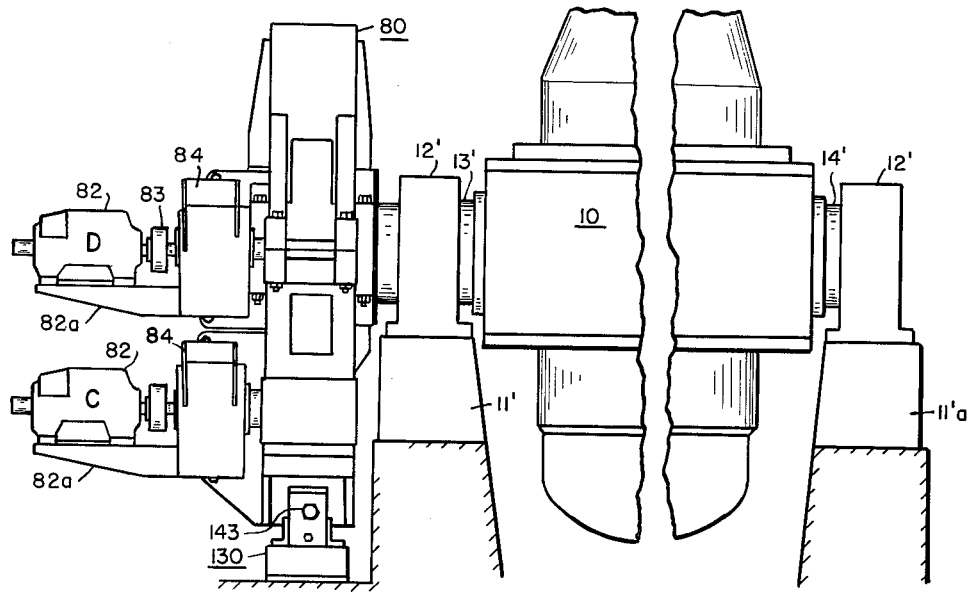
FIGURE 13 is a side elevational view on the same scale as and of the construction shown in FIGURE 12; in both FIGURES 12 and 13, the furnace vessel, converter or device is shown broken-away in order that details of our driving mechanism can be better illustrated.

In FIGURES 12, 13 and 14, we have shown motor units A, B, C and D at radially-spaced positions about the gear housing 80. Since each motor unit is of the same construction, their driving or actuating motors have all been designated as 82. As illustrated particularly in FIGURE 16, each motor 82 is secured on a forwardly-extending, shelf-like, mounting 82a that projects from an associated gear drive and reduction unit 84. Each unit 84, as particularly illustrated in FIGURE 17, has an output or drive shaft 85 that projects into the gear housing 80 and on which a drive pinion or gear 89 is mounted or secured. Bearing assemblies 86 and 87 are carried by the housing 80 for journaling the shaft 85 in a rotatable relation wherein the drive pinions or gears 89 operatively-engage or mesh with the driven gear 90, as further illustrated in FIGURES 14 and 15. It will be noted that each drive pinion 89 of each motor and gear unit has a peripherally spaced relation about and with respect to the housing 80 and the driven gear 90.

As shown in FIGURES 15 and 17, a bolted-together, partible, secondary housing 88 is provided for each driving or pinion shaft 85. The secondary housings 88 are integrally-secured within open portions in the main housing 80.

In FIGURES 14 and 15, it will be noted that a transversely spaced-apart, vertically-extending, upper pair of reinforcing ribs or struts 105 project from the front of the main housing 80 and extend downwardly therealong and, at their lower ends, terminate adjacent the flanges 81. A lower pair of the ribs 105 extend downwardly from adjacent the flanges 81 in line with the upper pair 105 and terminate and are secured to a cross-extending bracing or strut member 107. In addition, a pair of centrally-positioned and downwardly-extending spaced-apart strut or rib members 106 project from the flanges 81 in a side-spaced and parallel relation with the lower pair of ribs 105. As illustrated particularly in FIGURES 15 and 16, the ribs 106 have upper and lower forwardly-projecting wing portions 106a and 106b which serve as mountings for tensioning I-bolts, such as 115 and 118.

A pair of centrally-positioned downwardly-extending wing members 108 are also secured to the front end of the housing 80 and project between its central shaft mounting to the cross rib 107, see FIGURE 15. A central strut member 110 projects downwardly from the cross rib 107 in alignment with and as a continuation of a central member 109 and terminates in a downwardly-projecting rotation-resisting flange, web, bracket, stabilizing member or means 111. A pair of wings 112 are secured to the housing 80 in a spaced relation on opposite sides of the stabilizing member 111. Referring to FIGURE 15, side-extending torsion resisting members 113 are secured to the housing 80 and are secured between housings 88 of the gear reduction units to, in cooperation with a bottom, cross-extending torsion member 114, tie the gear reduction units 84 together, see also FIGURE 16 as to the member 114.

With particular reference to FIGURES 14 and 16, we have shown adjustable, tensioning, I-bolts 115 which, at their upper eyelet ends, are secured, to project downwardly from upper wing portions 116a by nut and bolt assemblies 115a. The lower eyelet ends of the pair of I-bolts 115 are secured to mounting wings 117 that project from the housings 88 of the gear units for motor units A and D and to the upper eyelet ends of a pair of I-bolts 118 by bolt and nut assemblies 116. The second pair of bolts 118 are secured at their lower eyelet ends by bolt and nut assemblies 118 to the wings 106b. In this manner, the gear units 86 of the motor units A and B may be adjustably tensioned as to their mountings with respect to the housing 80. A third pair of I-bolts 125 that are adjustable, as shown particularly in FIGURES 15 and 16, are at their upper eyelet ends, secured on projecting wings 108, and at their lower eyelet ends, are secured by bolt and nut assemblies 126 to wings 117 of a lower pair of gear reduction units 84 that are associated with the motor units B and C. A fourth pair of eyelets 128 are, at their upper ends, secured by the nut and bolt assemblies 126 on the wings 117, and at their lower ends, are secured by bolt and nut assemblies 128a on wings 112. In this manner, the lower pair of gear reduction units may also be adjustably-tensioned in their positioning on the housing 80.

In FIGURE 19, we have illustrated the construction of suitable resilient type of energy-absorbing and turn-resisting units 130 that are employed as opposed pairs, as shown in FIGURES 14 and 15, to cooperate with the projecting stabilizing member or means 111. In these figures, the stabilizing member 111 is shown provided with insert wear plates 111a on its opposite or opposed sides, against which abutment caps 147 are adapted to engage or abut to connect the stabilizing member with each of the side-positioned units 130. Each unit 130 has a base or stationary support 131 that is provided with a longitudinally-extending guide track or slot 131a for adjusting the positioning of its housing 133.

The housing 133 is of hollow or cylindrical construction and has, at its back end, an end closure 144 provided with an adjustment screw or bolt 143. An end abutment plate 133a projects downwardly as an integral part of the housing 133 and its closure 144 to serve as an abutment plate for adjusting the positioning of the housing along the guide slot 131a, through the agency of a threaded adjustment bolt 134 which is carried by an end plate 132 of the base 131. The housing 133 has a flange portion 133b and an enlarged cylindrical intermediately-positioned slide cylinder 133c, a front abutment closure ring 133d, and a front cylinder 133e projecting forwardly from the ring 133d. A bearing sleeve 136 is positioned between the inner side of the cylinder 133e and a cylindrical front slide sleeve of reduced diameter 135.

The slide sleeve 135 carries an end closure plug 137 through which a pin 138 projects to engage within a central bore 146a of a cylindrical slide member or element 146. I t will be noted in FIGURE 19 that the end closure 137 of the slide sleeve 135 abuts the back end of the slide element 146 for movement therewith. The element 146 is carried in sleeve bearings 145a within a central bore of a bearing stand 145 that is secured on the base member 131. The front end of the element 146 carries the abutment cap 147 which is adapted to engage wear plate 111a of the stabilizing member 111. The inner end of the pin 138 is secured on a forward end of a rubber cushion type of resilient movement-resisting assembly that is operatively-positioned in and extends within the slide sleeve 135 to, at its back end, rest against a slide plate 140.

The slide plate or piston 140 is operatively-positioned for movement, as indicated by the arrows, for a distance indicated as a in FIGURE 19, within the intermediate housing portion 133c for take-up movement. A second and larger pair of rubber cushions or a take-up assembly 141, at its forward end, abuts the slide plate 140 in opposition to the assembly 139 and, at its back end, abuts against an end adjustment plate or part 142 that is slidably-mounted within the main portion of the housing 133. The threaded adjustment bolt 143 has a pin extension 143a which projects within a central bore 142a of the plate 142 so as to align it on the adjustment bolt.

It will thus be apparent that the turn-resisting-resiliency or tension of the assembly 141 may be varied to meet the requirements of a particular installation by adjusting the bolt 143. The bolt 134 serves to maintain the unit 130 in a proper operating relation with the stabilizing member 111, in other words, to clamp it tightly against the wear plate 111a. The construction of the assemblies 139 and 141 may be similar to the construction of the rubber cushion assemblies as shown in FIGURES 2 and 5 of our co-pending application No. 235,964. The compression preload on the resilient assembly may also be accomplished by the use of hydraulic ram pressure, instead of by the use of an adjustable screw such as 143.

In FIGURES 20 and 21, we have illustrated a further form of stabilizing and turn-resisting unit 150. In this form or type, both opposed units 150 are mounted on a stationary base member which, at its opposite ends, has upwardly-projecting back abutments 151. A clevis or bracket 151a is secured to and projects from each abutment 151 and is connected by a pivot mounting pin 152 to a lever extension 153 of a stub end or boss of housing 154. It will be noted in FIGURE 21 that the boss end has a small longitudinal bore 154a therethrough to receive a reduced or pin end portion 153a of the lever 153 and to slidably-receive a reduced end portion of a piston rod 156. The boss portion of the housing 154 has a larger intermediate bore 154b to receive a slide bearing ring 157 therein for engagement by and movement with an abutment edge b of the rod 156.

The housing 154 carries a back abutment plate 159 for a tensioned snubber spring 158. The central bore of the plate 159 corresponds in diameter to the rod 156 to the left of the abutment edge b. The front end of the tension spring 158 abuts against a front bearing plate 160 which is adapted to slidably-move along the inner periphery of the housing 154 by reason of the engagement of a second abutment edge c of the rod 156. The front end of the housing 154 is provided with a closure plate 160 that is removably-secured to its front flange by bolt and nut assemblies 162. It will be noted that the diameter of the rod 156 to the left of the abutment edge c corresponds to the diameter of the bore in the closure 161. At its forward end, the rod 156 is provided with a clevis extension 163 that is secured by a pivot pin assembly 164 to a lever arm 165. The lever arm 165 has a front abutment foot or flange portion 165a which is adapted to engage against a side of the stabilizing member 111.

It will thus be seen that when turning force is exerted by a stabilizing member 111 on one of the units 150 of FIGURES 20 and 21, that this will exert inward compressing force on the spring 158 through the agency of the abutment edge c of the piston rod 156 and the slide plate 160. Movement of the rod 156 is accomplished to the right of FIGURE 21 by corresponding inward movement of its end along the bore 154a, as limited by the pin end 153a of the lever arm 153.

Although we have illustrated several forms of snubbing and turn-resisting units, such as illustrated in FIGURES 3, 4, 5, 10, 19, 20 and 21, it will be apparent that any suitable units may be employed, although we prefer a unit such as illustrated in FIGURE 19 which provides for adjusting the containing and controlling force action on the stabilizing member 15 or 111. FIGURE 2 of our co-pending application No. 235,964 also illustrates a suitable form of assembly for this purpose.

We also utilize a turning movement resisting unit that controls axial misalignment whether angular or endwise of the gear housing that, in effect, provides for and contains such a type of movement. In this connection, the means shown in FIGURE 2 of our co-pending application No. 235,964 is particularly effective, as is the means shown in FIGURE 19 of the present disclosure. The means shown in FIGURES 20 and 21 is adaptable to different types of stabilizing members, such as oppositely-positioned stabilizing members. In this connection, one such unit may be used with each such stabilizing member. Also FIGURE 3 of application No. 235,964 shows an excellent type of flexible shaft connection between an actuating or driving motor and its associated gear mechanism which may take the place of the means shown in FIGURES 8, 9 and 11 of the present disclosure.

What we claim is:

1. In a driving structure for a heavy device such as a furnace vessel that is subjected to misalignment force during its use and that has shaft portions turnably mounted on stationary support means, a driven gear securely-mounted on one of the shaft portions, a radially-outwardly-extending housing mounted on the one shaft portion for coincident axial movement therewith and for relative rotation of the one shaft portion with respect thereto, a driving gear rotatably carried by said housing and operatively-connected to said driven gear for turning the device with respect to said housing, and means cooperating with said housing and the stationary support means for resisting and containing turning movement of said housing on the one shaft portion.

2. In a driving structure as defined in claim 1 wherein additional means cooperates with said last-mentioned means to provide for and control coincidental axial movement of said housing.

3. In a driving structure for a heavy device such as defined in claim 1 wherein said cooperating means has arm means projecting from said housing and a pair of means engaging said arm means to oppose turning movement of said arm means.

4. In a driving structure as defined in claim 1 wherein, a group of driving gears are peripherally-spaced about said housing and operatively-engage said driven gear, and said driving gears are rotatably carried by said housing for coincident movement therewith.

5. In a driving structure as defined in claim 4 wherein a group of motors are mounted on and carried by said housing for coincident movement therewith and in an adjacent operatively-connected relation with said group of driving gears.

6. In a driving apparatus for a heavy device such as a furnace vessel that is subjected to misalignment force during its use and that has trunnion shafts turnably-mounted on stands, a driven gear securely positioned on one of the trunnion shafts for rotative movement therewith, a gear housing, means mounting said gear housing on the one trunnion shaft adjacent said driven gear for rotation with respect to the one trunnion shaft and for coincident axial movement with the one trunnion shaft and said driven gear under axial misalignment induced on the one trunnion shaft by the device, a driving gear rotatably-carried by said gear housing for coincident movement with said gear housing and said driven gear and operatively-connected to said driven gear for turning the device on the stands with respect to said gear housing and means cooperating with said gear housing for resisting turning movement of said gear housing and for controlling coincident axial movement of said gear housing under misalignment induced on the one trunnion shaft by the device.

7. In a driving apparatus for a heavy device such as a furnace vessel that is subjected to misalignment force during its use and that has trunnion shafts turnably-mounted on stands, a driven gear securely-positioned on one of the trunnion shafts for coincident axial movement therewith, a radially-extending support rotatably-mounted with respect to the one trunnion shaft adjacent said driven gear for coincident axial movement with the one trunnion shaft and said driven gear under axial misalignment induced on the one trunnion shaft and said driven gear by the device, a driving gear rotatably-carried by said support for coincident axial movement with said support and said driven gear and operatively-connected to said driven gear for turning the device on the stands with respect to said support, means engaging said support for resisting turning movement of said support, and means cooperating with said support and said resisting means for containing coincident axial movement of said support under axial misalignment induced on the one trunnion shaft by the device.

8. In a driving apparatus for a heavy device such as a furnace vessel having trunnion shafts turnably-mounted on stationary structure, a driven gear securely-positioned on one of the trunnion shafts for coincident axial movement therewith, a radially-extending support rotatably-mounted with respect to the one trunnion shaft adjacent said driven gear for coincident axial movement with the one trunnion shaft and said driven gear under axial misalignment induced by the device, a driving gear rotatably-carried by said support for coincident axial movement wth said support and said driven gear and operatively-connected to said driven gear for turning the device on the stationary structure, means cooperating with said support and the stationary structure for resisting turning movement of said support and for positively maintaining the turning movement of said support within maximum limits, and means for containing coincident axial movement of said support under axial misalignment induced on the one trunnion shaft by the device.

9. In a driving apparatus for a device such as a furnace vessel that is subjected to misalignment during its use and that has a shaft turnably-mounted on a stationary support, a driven gear carried by the shaft for actuating it and for movement therewith, a gear housing carried by the shaft for coincident axial movement therewith and for relative rotation of the shaft with respect thereto, a driving gear rotatably-carried by said housing and operatively-connected with said driven gear for turning the shaft with respect to the stationary support, and means cooperating with said housing for substantially from the beginning resisting turning movement of said housing and that provides for and contains coincident movement of said housing under expansion force exerted on the shaft by the device.

10. In a driving apparatus for a device such as a furnace vessel that is subjected to misalignment during its use and that has a shaft turnably-mounted on a stationary support, a driven gear carried by the shaft for actuating it and for coincident movement therewith, a gear housing carried by the shaft for coincident axial movement therewith and for relative rotation with respect thereto, a driving gear rotatably-carried by said housing and meshing with said driven gear for turning the shaft with respect to the stationary support, stabilizing means secured to and projecting from said housing, turning movement resisting means for said stabilizing means, and means connecting said turning movement resisting means to said stabilizing means for containing and resisting coincident angular movement of said housing and with respect said turning movement resisting means.

11. In a driving apparatus as defined in claim 10 wherein, a driving motor is carried by said housing for coincident movement therewith, and said motor is operatively-connected to said driving gear for actuating it.

12. In a driving apparatus as defined in claim 10 wherein said turning movement resisting means is resilient and has means for adjusting its resiliency.

13. In a driving apparatus as defined in claim 10 wherein said connecting means has means engaging said stabilizing means and has pivotal means connected to said turning movement resisting means.

14. In a driving apparatus as defined in claim 13 wherein pivotal means connects said turning movement resisting means to the stationary support.

15. In a driving apparatus for a heavy device such as a furnace vessel that is subjected to misalignment force during its use and that has trunnion shafts turnably-mounted on stands, a driven gear securely-positioned on one of the trunnion shafts, a radially-extending support rotatably-mounted with respect to the one trunnion shaft about said driven gear for coincident axial movement with the one trunnion shaft and said driven gear under axial misalignment induced by the device, a driving gear rotatably-carried by said support and operatively-connected to said driven gear for turning the device on the stands, means cooperating with said support for resisting turning movement of said support, and said support having means slidably-engaged by said cooperating means for providing sliding movement for said support with respect thereto under axial misalignment induced by the device.

16. A driving apparatus as defined in claim 15 wherein a stationary mounting is provided and has means for adjustably-carrying said cooperating means.

17. In a driving apparatus for a heavy device such as a furnace vessel that is subjected to misalignment force during its use and that has trunnion shafts turnably-mounted on stands, a driven gear securely-mounted on one of the shafts for coincident axial movement therewith and for turning the device, a radially-outwardly-extending support rotatably-mounted with respect to the one shaft adjacent said driven gear for coincident axial movement with the one shaft under axial misalignment induced by the device, a driving gear operatively-carried on and retained in a rotatably-secure relation by said support for coincident axial movement with said support and said driven gear and operatively-engaging said driven gear for actuating it, motor means operatively-connected to said driven gear for actuating it, stabilizing means projecting radially of said support, and means engaging said stabilizing means to resist turning movement of said support and to contain axial misalignment induced on the one shaft by the device.

18. In a driving apparatus for a heavy device such as a furnace vessel that is subjected to misalignment force during its use and that has trunnion shafts turnably-mounted on stands, a driven gear securely-mounted on one of the shafts for coincident axial movement with the one shaft and for turning the device, a housing, means rotatably-mounting said housing on the one shaft for coincident axial movement therewith under axial misalignment induced by the device, a drive mechanism operatively-carried and retained in a rotatably-secure relation on said housing for coincident axial movement with said housing and said driven gear and operatively-connected to said driven gear for actuating it to turn the one shaft and the device, stabilizing means secured to and projecting from said housing, and opposed means engaging said stabilizing means to resist turning movement of said housing and to contain movement of said housing with the one shaft under misalignment induced by the device.

19. In a driving apparatus for a heavy device as defined in claim 18 wherein said opposed means comprises, a pair of force-dampening means, and means endwise-connecting said pair of force-dampening means to said stabilizing means.

20. In a driving apparatus for a heavy device such as a furnace vessel that is subjected to misalignment force during its use and that has trunnion shafts turnably-mounted on stands, a driven gear securely-mounted on one of the trunnion shafts for turning the device, a bearing cage rotatably-mounted on the one trunnion shaft for coincident axial movement therewith under axial misalignment induced by the device, a drive gear mechanism operatively-carried and retained in a secure relation on said bearing cage and operatively-connected to said driven gear for actuating it to turn the one trunnion shaft and the device, stabilizing means secured to and projecting from said bearing cage, opposed means engaging said stabilizing means to resist turning movement of said bearing cage and to contain coincident axial movement of said bearing cage with the one trunnion shaft under axial misalignment induced by the device; and said opposed means comprising, a pair of opposed mounts, and a pair of rod-like elements positioned on said mounts to engage opposite sides of said stabilizing means.

21. In a driving apparatus for a heavy device such as a furnace vessel that is subjected to misalignment force, during its use and that has trunnion shafts turnably-mounted on stands, a driven gear securely-mounted on one of the trunnion shafts, a gear housing extending about said driven gear and being journalled with respect to the one trunnion shaft on opposite sides of said driven gear, said gear housing being secured against movement along the one trunnion shaft, a drive gear operatively-carried by said gear housing and operatively-engaging said driven gear to turn the one trunnion shaft and the device, means retaining said drive gear in an endwise-fixed relation with respect to said driven gear and said gear housing, and means cooperating with said gear housing to resist turning movement thereof and to provide coincident axial movement of said gear housing with the one trunnion shaft under axial misalignment induced by the device.

22. In a driving apparatus for a furnace vessel as defined in claim 21 wherein, said gear housing encloses said driven and said driving gears to protect them from dust and refuse, and a motor is operatively-connected to said drive gear for actuating it to turn the device.

23. In a driving apparatus for a heavy device as defined in claim 21 wherein a motor is flexibly-operatively connected to said drive gear for actuating it to turn the device and to provide for some relative movement between said drive gear and said motor.

24. A driving apparatus as defined in claim 21 wherein at least one motor is secured on said gear housing and is operatively-connected to said driving gear for actuating it.

25. In a driving apparatus for a heavy device such as a furnace vessel that is subjected to misalignment force during its use and that has trunnion shafts turnably-mounted on stands, a driven gear securely-mounted on one of the trunnion shafts to turn it, housing extending along and adjacent to said driven gear and being journalled with respect to the one trunnion shaft, said housing being secured against movement along the one trunnion shaft, a group of drive gears operatively-carried by said housing and operatively-engaging different portions of the periphery of said driven gear to turn the one trunnion shaft and the device, means operatively-connected to said drive gears for actuating them, and means cooperating with said housing to resist turning movement thereof and to provide for coincident axial movement of said housing under axial misalignment induced on the one trunnion shaft by the device.

26. In a driving apparatus for a furnace vessel as defined in claim 25 wherein said drive gear actuating means comprises individual motor means carried by said housing and operatively-connected to each of said drive gears for actuating them.

27. In a driving apparatus for a heavy device such as a furnace vessel that is subjected to misalignment force during its use and that has trunnion shafts turnably-mounted on stands, a driven gear securely-mounted on each of the trunnion shafts for turning them, a radially-outwardly-extending housing rotatably mounted with respect to each of the trunnion shafts about the driven gear thereon, each of said supports being secured against movement along the trunnion shaft upon which it is mounted, a driving gear rotatably-carried by each of said housings and operatively-connected to the associated driven gear for turning the device, motor means operatively-connected to each of said drive gears for actuating them, means cooperating with each of said housings for resisting turning movement thereof, and means cooperating with at least one of said housings to provide coincident axial movement thereof with the associated trunnion shaft under axial misalignment induced by the device.

28. In a driving apparatus for a heavy device such as a furnace vessel that is subjected to misalignment force during its use and that has trunnion shafts turnably-mounted with respect to stationary support means and wherein the trunnion shafts are required to operate under varying conditions of movement with respect to the support means, an improved transmission comprising, a driven gear securely-mounted on at least one of the trunnion shafts for turning it, a radially-outwardly-extending housing journalled with respect to the one trunnion shaft adjacent said driven gear and secured against movement along the one trunnion shaft, a driving gear mechanism operatively-carried on said housing and secured against axial movement thereby and operatively-connected to said driven gear for turning the device, variable resistance means for resisting turning movement of said housing, and means cooperating with said housing for providing limited coincident axial movement thereof with the one trunnion shaft to compensate for axial misalignment induced by the device.

29. A driving apparatus for a heavy device as defined in claim 28 wherein said variable resistance means comprises, a radially-projecting member connected to said housing, a pair of opposed connecting rods that at their forward ends contact opposite ends of said member, force-dampening means connected to the other ends of said connector rods, and means for adjusting the resistance offered by said force-dampening means.

30. A driving apparatus for a heavy device such as a furnace vessel that is subjected to misalignment force during its use that has trunnion shafts turnably-mounted on stationary structure, a driven gear securely-mounted on at least one of the trunnion shafts, a gear housing mounted about the one trunnion shaft for relative rotation with respect thereto and in such a manner as to insure coincident axial movement of said housing with said driven gear under axial misalignment induced by the device, a drive gear operatively-carried by said housing and operatively-connected to said driven gear for turning the one trunnion shaft and the device, stabilizing means projecting radially from said housing, and means engaging said stabilizing means in an opposed relationship for resisting and containing turning movement of said stabilizing means and said housing in either direction and for controlling coincident axial movement of said stabilizing means and said housing with respect to said engaging means under axial misalignment induced by the device.

31. In a driving apparatus for a device as defined in claim 30 wherein, said engaging means has adjustable take-up means for positioning it with respect to said stabilizing means for limited movement of said stabilizing means and said housing with respect thereto, connecting rods are secured to opposite ends of said engaging means, and movement-resisting means is operatively-connected to said connecting rods for controlling resistance to turning movement of said stabilizing means.

32. In a driving apparatus for a device as defined in claim 30 wherein said engaging means has opposed bolt elements engaging opposite sides of said stabilizing means, and stationary mounts are positioned for holding said bolt elements in relatively tight engagement with opposite sides of said stabilizing means.

33. In a driving apparatus for a heavy device such as a furnace vessel that is subjected to misalignment force during its use and that has trunnion shafts turnably mounted on stands, a driven bull gear secured on one of the trunnion shafts, support structure rotatably-carried with respect to the one trunnion shaft about said driven gear for coincident axial movement with the one trunnion shaft and said driven gear under axial misalignment induced by the device, a driving gear operatively-carried by said support structure and meshing with said driven gear, motive power means having a stationary mounting and operatively-connected through a self-aligning coupling to said driving gear for turning the one trunnion shaft, and means cooperating with said support structure to resist rotative movement thereof with respect to the one trunnion shaft and to provide limited coincident axial movement of said support structure with the one trunnion shaft under axial misalignment force induced by the device.

References Cited by the Examiner

UNITED STATES PATENTS 3,151,502   10/64   Kron et al. _____ 74—411

DON A. WAITE, *Primary Examiner.*